Figure 1:
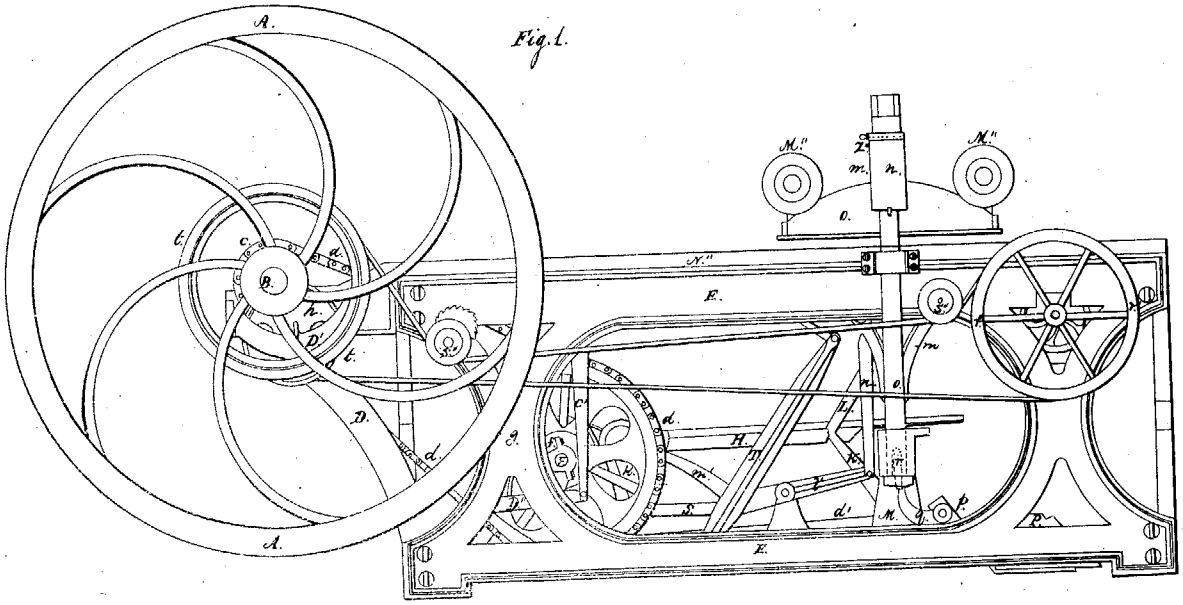

8380X

5 Sheets—Sheet 1.

O. TUFT.

POWER PRINTING PRESS.

Patented Aug. 22, 1834.

8380X
O. Tufts. Sheet 2. 5 Sheets
Printing Press
No. Patented Aug. 22. 1834.
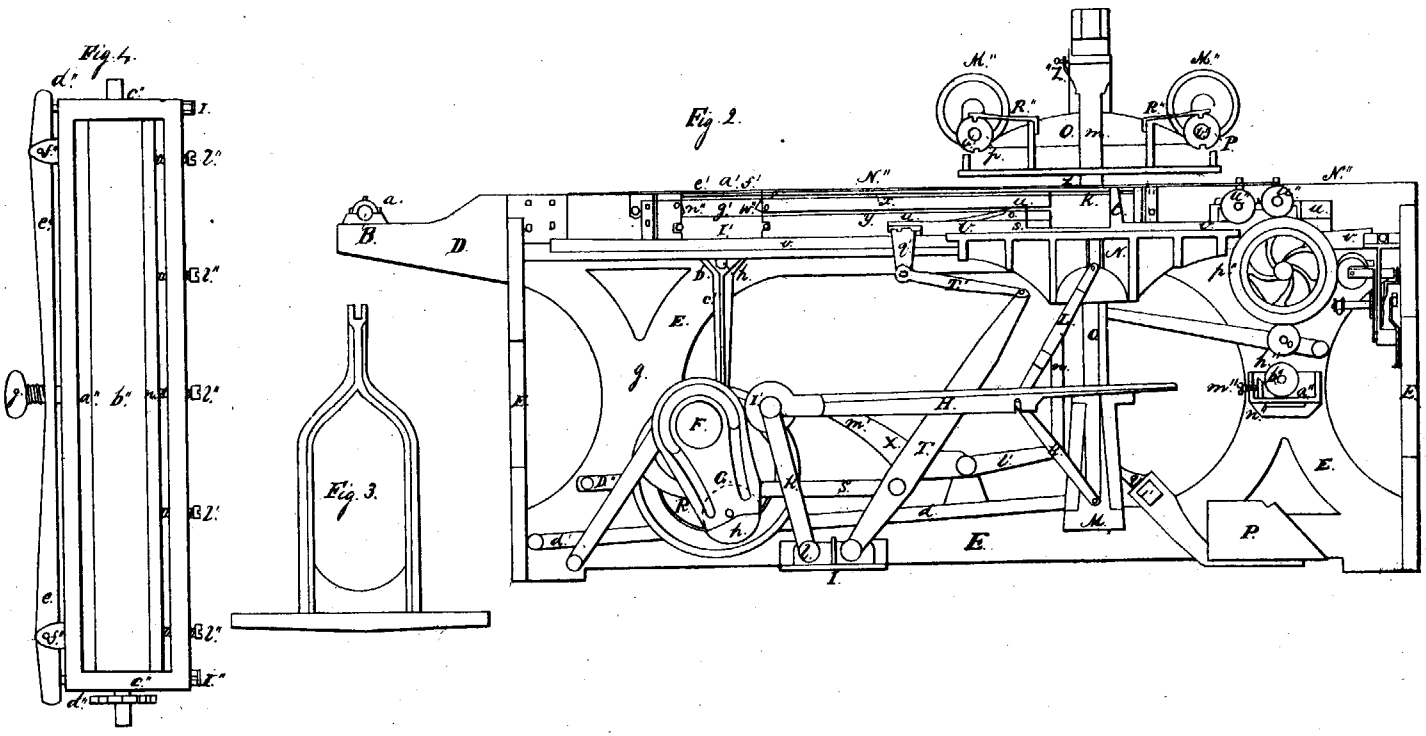

8380X
Sheet 3. 5 Sheets.
O. Tufts.
Printing Press.
Patented Aug. 22. 1834.
No.
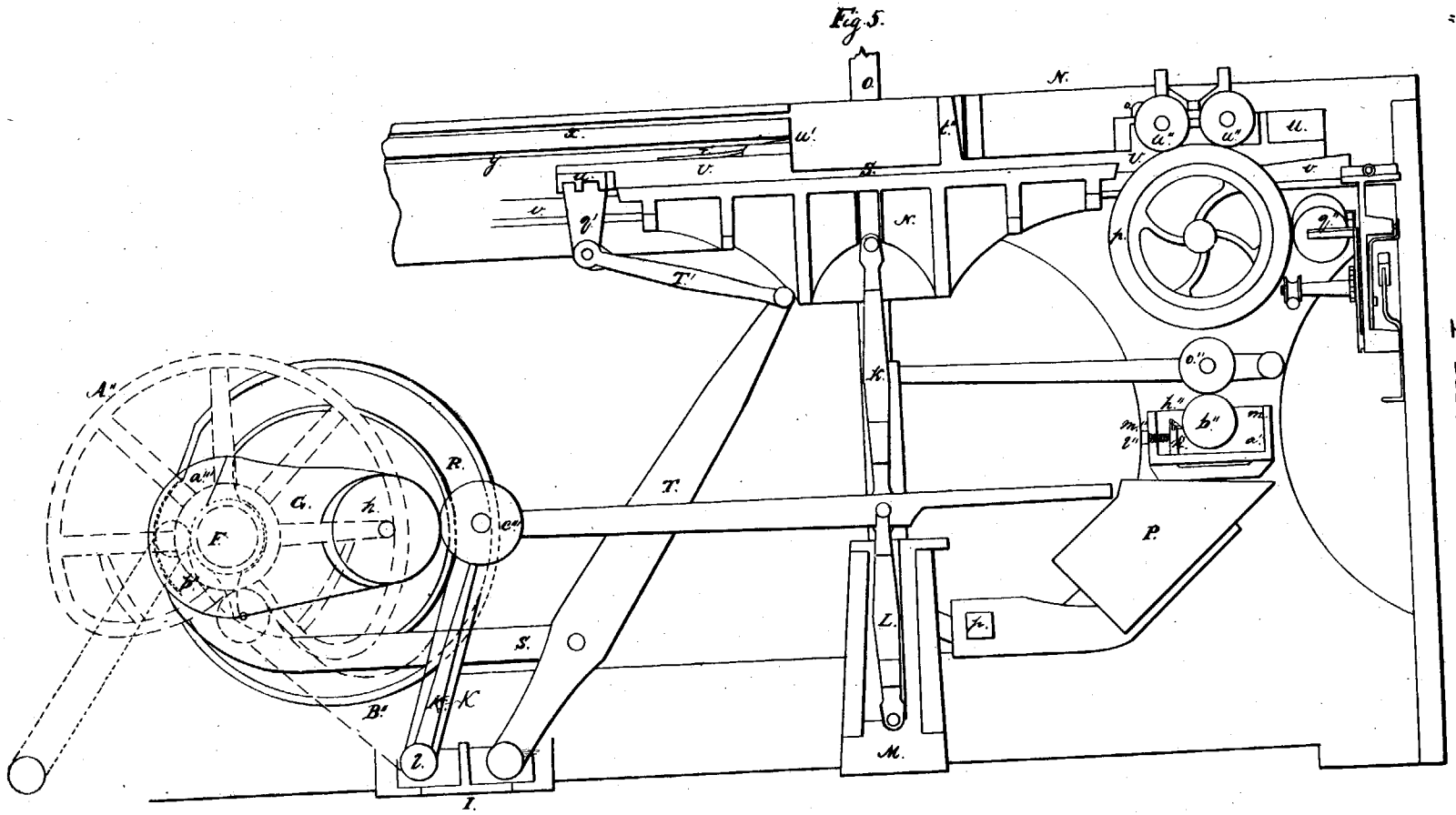

8380X
5 Sheets—Sheet 4.
O. TUFT.
POWER PRINTING PRESS.
Patented Aug. 22, 1834.
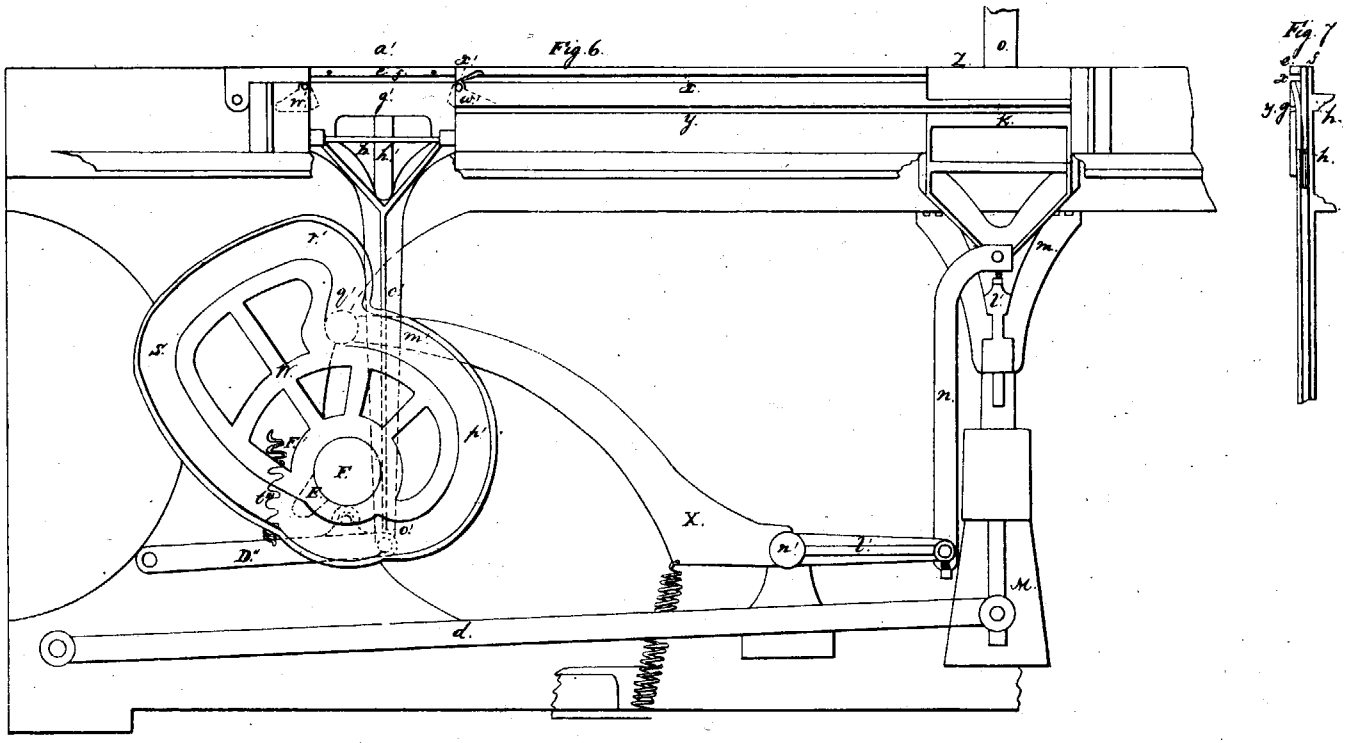

8380X
5 Sheets—Sheet 5.
O. TUFT.
POWER PRINTING PRESS.
Patented Aug. 22, 1834
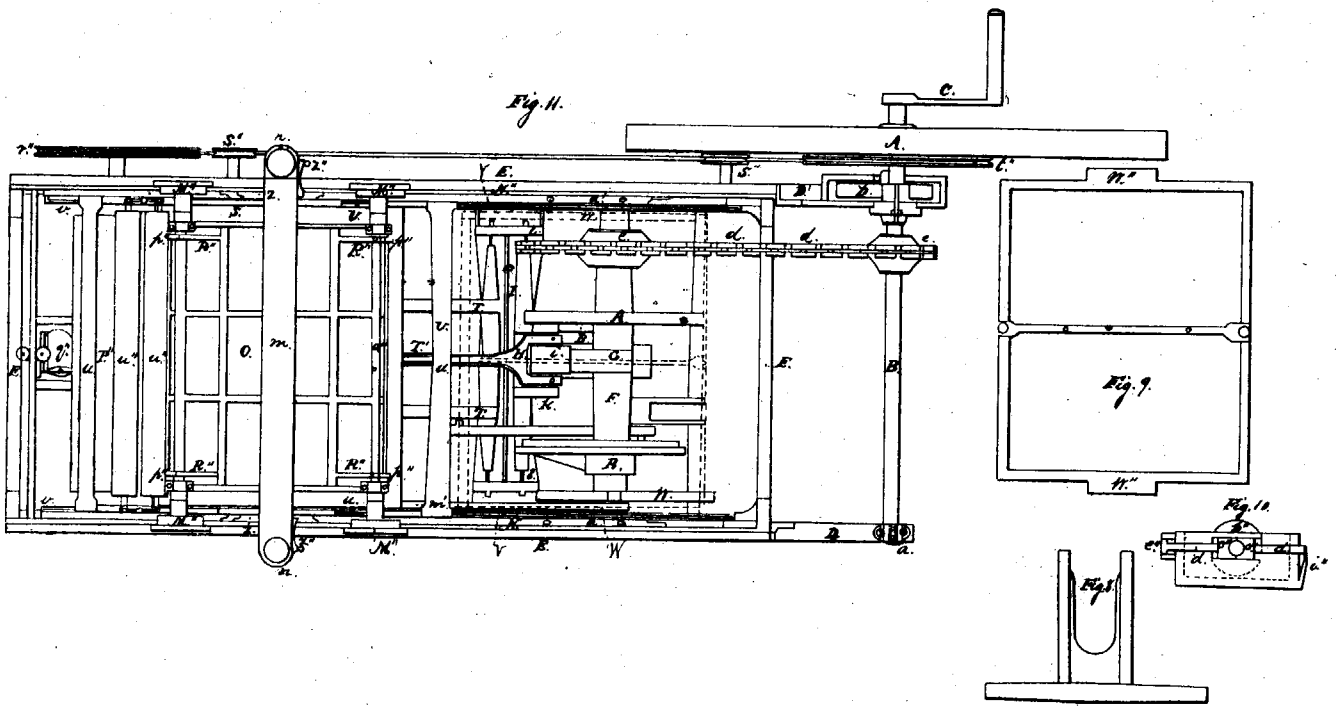

Otis Tufts
Letters Patent

The schedule referred to in these Letters Patent and making part of the same containing a description in the words of the said Otis Tufts himself of his improvements in the "Power Printing Press"
To all persons to whom these presents shall come Otis Tufts of Boston in the County of Suffolk and state of Massachusetts sends greeting Be it known that I the said Otis Tufts have invented made and applied to use certain improvements of machinery for the purposes of printing paper or other substances generally used for receiving impressions from types. Which inventions when all combined together with other parts constitute and are commonly known by the appellation "of a "Power Printing Press". The disposition arrangement and uses of the several parts I have fully described and set forth in the following words and annexed drawings which taken in connection form my Specification. The main or principle difference between this Power Press and others now in use consists in supplying it with paper to be printed from one side of the forme by using two friskets one of which is under the operation of an impression from the platten while the sheet of paper last printed is being removed from the second frisket and another sheet supplied. As soon as the frisket first mentioned has received an imprint from the types it is withdrawn by the operation of the machinery from between the platten and forme and the second frisket caused to pass in between the platten and forme in there to be acted on in its turn. So on in succession each passes out from between the platten and forme with its printed sheet while the other with the sheet to be printed is made to pass in between the platten and forme A. represents the fly-wheel of the press constructed in the usual form and suitable size being attached to the driving shaft B. The shaft is operated on and caused to turn round by man [illegible]

Drawing in [illegible]

ual labor exerted on a crank C. or by means of a steam engine,
horse or water power acting on a drum or pulley affixed in its end.
The shaft B. revolves at one end in a composition or other suit
able metal box a. attached to the extremity of the strut D. of
the cast iron frame E.E. The opposite end rests on the periphery
of a friction wheel b. in the strut D.' — A pinion c. is fastened
in the driving shaft B. whose teeth act in the interstices or
links of a chain belt d. passing around it and the cogged wheel
e. in the main shaft F. — The frame E E. of the press is of
cast iron but may be constructed of wood or other suitable material
shaped and formed as seen in the drawings or otherwise shaped
and formed to answer the intended purposes of supporting the bed
platten and machinery for the operations connected with the
same. The main shaft F. has journals at each extremity
revolving in composition or other suitable metal boxes f. f. at
tached to the upright posts g. g. of the frame work E. E. as seen
and represented in the drawings. To the centre of the main shaft
F. is secured in a proper manner a cam G. constructed of the form
seen in Fig's 2, 5. having a roller h. in its small end for the pur
pose of diminishing the friction at the time of the impression
and which also turns round a certain distance at every revolu
tion of the cam, thus presenting a new surface for the roll in
the end of the pitman to move over by which the abrasion of the
rolls is greatly diminished. The opposite end of the cam, the arc
of a circle, the centre being in the centre of the shaft. During
the revolution of the last mentioned part on or against the
roller i in the end of the pitman H. it produces no motion
of the pitman either backwards or forward but as soon as the
side of the cam comes in contact with the roll it presses it
forward until it arrives at the extreme end of the roll in the
cam when the impression ceases and the opposite side of the
cam permits the pitman to recede until the roll in the
end of the pitman meets the circular surface of the opposite end
of of the same and again becomes stationary during the revolution
of the said surface. The pitman H. is supported during its
back and forth movements by the upright vibrator K (of the
form seen in Fig. 8.) to which it is attached at the top by a joint.
The lower end of this upright K. revolves on bearings l. l. attached
to a bar or connecting piece of iron I. of the opposite sides of the frame
E.B. The opposite end of the pitman H. rests on the centre pin
of the toggle joints K. L. and causes them to be brought together
or in a straight line with each other by the centre pin bear-
ing against the side of a circular space cast in the lower side of
the pitman as more clearly represented in Fig. 3. That part
of the pitman from where it rests on the centre pin of the toggles
(when in action) to the extreme end of the same is formed flat
on the lower side so that when the pitman is raised this part
offering no projections but a plain surface throughout its length
to the centre pin of the toggles moves over the said centre pin
without producing any back or forth motion of the joints.
The lower end of the toggle K. rests on a pin in steps in
the large iron cross beam M. The upper end of the toggle
L. plays on a similar pin or step in the lower side of the
bed N. The platten O has a large iron beam m. cast
or attached to its upper side, the ends n. n. projecting over
the sides of the frame E.B. Strong wrought iron bolts o. o.
having keys and nuts at their tops to admit of their be-
ing secured to the projecting ends of the cross beam of the
platten, pass downward through guide boxes in a vertical
direction and are secured by heads at their opposite ends
to the cross beam M. The platten O cross beam m. and
connecting bolts o. o. are balanced by a counterpoise weight
P. attached to a lever formed of projections from a horizontal
shaft p. supported at its ends by journals and boxes at-
tached to the opposite sides of the frame E.B. the shaft serv-
ing as the fulcrum of the lever. On the extremity of the horizontal horizontal shaft p. is fixed a curve projecting iron q. whose end
is hollowed out as a step to secure and support a small pit
man r. The upper end of the small pitman r. terminates
in a small ball which turns in a hemispherical socket
in the lower side of the head of the upright bolt O. The fly
wheel being set in motion turns the driving shaft B. there
by causing the cogged pinion c. to turn round by the inter
vention of the chain belt, the cogged wheel e. in the main
shaft D. The cam G. revolving with the shaft acts in
the pitman which it pushes forward communicating the
motion to the toggles. bringing them in a straight line
at the same time drawing downwards the platten on the
sheet between it and the forme of type. thus giving the
impression. On the main shaft E is fixed the grooved
cam R. for the purpose of operating on the friskets to produce
their rectilinear motion in and out from between the platten
and forme. After the impression has taken place the toggles
are brought back as the platten rises by a cam A" on the
main shaft (of the form seen in the drawing or otherwise shaped
and formed to answer the purpose) As the shaft revolves this
cam presses down an arm or strut B" attached to the upright
K. The peculiar object of this cam is to always ensure the back
motion of the toggles. which as they are brought in a straight
line with each other are sometimes liable in printing presses
to remain so and not depart from it: A small iron or steel
roller traversing on a pin in the end of the bent bar S. travels
in the groove of the cam R. The bar S. at its other extreme
ty. is attached to the upright vibrator T. by a pin at a suffi
cient distance from its foot or centre of motion so as to form
a joint to admit the movements to and fro of the vibrator
The vibrator T is formed as represented in Fig. 3. open in
the centre to permit the passage through and action of the
pitman and upright K. At its foot it moves on suitab
bearings bearings similar to the upright K. The top of this vibrator is attached by a joint to the connecting rod T'' whose opposite end is attached by another joint to the projection q' of the fris-ket carriage U. The frisket carriage U. is composed of two side pieces s.t. united together at each end by a brace or iron bar u,u,. The sides of the frisket carriage are nicely fitted to traverse in rails v.v. similar to the bed and rail way of the common hand printing press. the rails being of a proper length and size to ensure the required motion in and out from the forme. The friskets are plain rectangular iron frames as seen in Fig. 9. with wide ears or projections w.w. of suitable length on each end which serve to sustain them with the sheet in the grooves through which they move. They are covered and prepared in the usual way for printing with interstices or spaces cut out for the operation of the type on the paper. The projections before mentioned on the ends of the friskets move back and forth in two grooves x.y. cut in a plate of iron or other metal screwed or other wise properly fixed to the sides of the frame E.E. z. a' is the apparatus for changing the friskets from one of the grooves x.y. to the other as the case may be. The part denominated a is composed of composition or any other suitable metal shaped in the front view as represented in Fig. 6. and more clearly shown in section Fig. 7. It is constructed of a plate b' at top to which is attached a long shank c' whose foot is attached by a joint to a bar D'' vibrating on a pin at its opposite end passing into the frame. As the main shaft re-volves a small cam E'' strikes against the top of the bar D'' moving it downwards and the plate b' connected to it. A spring F' operates to draw upward the bar D'' when the action of the cam has ceased. A long bar d' vibrates at e' on a pin affixed to the inside of the frame E.E. the op-posite end being attached by a joint to the cast iron cross beam beam M. The office of this bar is to prevent the lateral pressure of the pitman on the lower toggle joint from changing the cross beam M. from a right line during its perpendicular motions. To the top of the plate b' is screwed or otherwise attached a straight bar c' the lower side of which is intended to form the upper side of a groove f'. The lower part of the groove f' is formed of a bent piece of metal g' attached at its lower end by a joint to the side of a space cut in the plate b'. A spring h'. bears against the back of the piece g' to press it outwards during its operations. The outer fall of the straight bar c' is in the same plane with the outer face of another straight bar i'. screwed or otherwise affixed to the sides of the frame E, E. When the plate b' is raised to the upper groove X. the lower side of the straight bar c'. coincides with the upper side of the said groove X.
The spring h' pushing the curved piece of metal g' outwards causes its top to coincide with the lower side of the groove X, so as to produce a continuation of the groove X. ready to receive an ear or projection w'. of the frisket. While the plate b' is moving down the straight bar i' causes the curved piece of metal g' to recede inwards so as to deposit the ear or projection of the frisket on the upper face of the bar i' which is a continuation of the lower face of the lower groove Y. As the plate b' rises again to receive another frisket the curved part g'. by the pressure of the spring h' moves outward and receives the frisket from between the platten and forme, brought out by the frisket carriage. Having described a' we proceed to z which consists of a plain plate of composition or other suitable metal shaped somewhat similar to a' but without the curved piece g' and spring h'. It has a simple groove k. cut in it and is guided in a perpendicular direction during its motions up and down by the circular [illegible] l. sliding through a round hole in a piece of iron m m. screwed or otherwise attached to the side of the frame E.
The proper motions and times of ascent and descent
are regulated by the form and revolution of the frisket
cam W on the main shaft F. A long lever X formed
of two projecting bars l' m' from a horizontal shaft n' supported by suitable
bearings attached to the sides of the frame E E, has a roller turning
on a pin at its end m', which roller moves in the grooved surface
of the cam W. The opposite arm l' has connected with it by a joint
the foot of the upright bar n' whose top is attached by a joint
to the crank l' of the moveable plate z. The plate z being supposed
up so that its groove shall coincide with the long groove x
while the part of the cam W from o' to p' Fig. 6. is operating on the
roll in the end m' of the lever X. it moves the plate z. downwards
so as to bring the groove in it in a line with the lower groove
y. to receive the frisket from the groove y. While the roll moves
over the curved surface from q' to r' the plate z is brought down
still further, untill it meets the bed of type when the platten
operates on the paper in the frisket during which time the roll is
moving over the space from r' to s.' which is an arc of a circle
the centre being in the centre of the main shaft. The impression
having taken place the platten moves a short distance upward be
fore the frisket in order to clear itself from the paper. The roll then
begins to move over the curved surface of the cam from s' to t'''
which raises the frisket up to the upper groove x. through which it
is moved by the frisket carriage into the groove in the plate a' with
the printed sheet to be removed and another sheet substituted.—
The plate a' having received the frisket is carried downwards by
the next revolution of the cam and the curved pieces of metal g'
g' on which the ears of the frisket rest recede and deposit the
frisket on the tops of the straight bars i' i'; there being a set of the
plate a' no plate z. for each ear of the frisket that is a set in
the inside of each of the sides of the frame E. E. The frisket is then
operated on by the frisket carriage and carried in between the plat
ten ten and forme for an <u>impression</u>. That part of the frisket carri
age which produces the movements back and forth of the friskets
in the grooves X. Y. is represented at t' u'. t' is an upright pro-
jecting piece of iron on the top of each side of the frisket carriage.
Its office is to push the frisket out from between the platten and
forme through the groove X. into the groove in the plate a'—
u' is a small catch vibrating on and connected to the frisket car-
riage by a joint at its end and always pressed upward by a small
spring v.' When the frisket carriage passes outward from the
platten with a frisket the small catch u'. strikes against
the under surface of the ear on the lower frisket and is pressed
down during its motions under the said surface. As soon as it
leaves the surface it flies upward. When the frisket carriage
is carried inward the ends of the catches u'. u'. come in contac
with the ears or projections of the frisket thus pushing it through
the lower sett of grooves Y. Y. into the groove in the plate z when
it is received and carried downward by the cam W. to receive
an impression from the platten. Afterwards it is raised by the
action of the said cam W. to the upper groove X. The frisket ca
riage then moving outward the projections t'. t'. on each of
the sides of the carriage strike against the ears of the frisket and
push it through the upper grooves X into the groove in the
plate a' The above arrangement of the machinery is consider
ed fully sufficient for the operation of the friskets but to guard
against any accident which might happen by the curved pie
g' catching against and lifting the ear of the frisket during its up
ward movement two small pieces of iron W." W." are so hung at an u
per corner of each that the action of gravity will cause them alwa
to stand outward to prevent the frisket ear from rising. The ear du
ring its downward motion presses the small catches W." W." into the
socket or space in the plate of iron in which the grooves X. Y. ar
cut as seen in Fig. 6. but as soon as the frisket is deposited on
the lower edge of the lower groove the small catches are relieved a
fly fly outward, thus rendering it impossible for the curved piece g'
to raise the frisket so as to prevent it being pushed through the
lower sett of grooves y. y. Furthermore should the frisket af-
ter the carriage has left it on the top of the curved pieces of metal
g' g' by a jar of the machinery or any other cause, slide forward
in the upper groove x. there is danger when the plate b' goes down,
of the ears of the frisket being injured. In order to prevent an
occurrence of this nature a small a small spring x' is affixed
to either the upper or lower side of the end of the groove so that when
the ear of the frisket moves through the groove it shall pass over
the surface of the spring and press it into a space adapted to
receive it. As soon as the ear leaves the spring it flies outward
thus effectually closing the end of the groove against a receding
motion of the frisket. The grooved cam R. is so formed and
placed on the main shaft that while the roll on the end of the
bar S. is moving from a''' to b''' Fig. 5. it produces no motion
of the vibrator or in other words the vibrator remains stationary,
during the time the platten is giving the impression to the sheet
but when the impression ceases the roll travels in that part of the groove
from b''' to c''' which brings the frisket carriage out from the plat-
ten with the frisket on which is the printed sheet returning
the carriage while it travels from c''' to a''' with the other fris-
ket carrying the sheet of paper to be printed. Having described
the machinery for producing the impression and change of the
friskets from one sett of grooves to the other together with the situ-
ation and arrangement of the several parts in and about the
frame, we next proceed to explain that part of the press whose [illegible]
office is to distribute the ink and impart it to the form of
type on the bed. In many respects the number of ink rollers
and general arrangement of the same are as has been heretofore
used but the construction of the ink fountain is varied. Fig's 4. 5.
represent different views of the fountain which is a cast iron
box of the transverse section seen in Fig. 6. a'' is the space for
the the reception of the ink in which the lower side of the fountain roll b" is immersed. The fountain roller b" is supported at its ends by journals in composition boxes c" Fig. 10. The boxes are placed in a square space adapted to receive them and allow sufficient play for the movements back and forth of the ink roller. Against one of the sides of each of the boxes a pin d" rests its other extremity resting against the short arm of a lever e" whose fulcrum is at f." A screw g" common to both of the ends of the long arms of the levers e".e" on being turned presses out the long arms of the levers e".e" thus causing the fountain roller in the boxes c".c" to be carried up nearer the edge of the plate h" at pleasure. The springs i" i" operating against the pins k" k" resting against the opposite sides of the boxes c".c" and thus when the screw is turned in the other direction cause the inking roller to depart from the edge of the plate h". The object of the above is to regulate the thickness of the surface of the ink on the fountain roller. The proper breadth of ink on the surface is obtained by a number of screws l".l".l" in the side m" set at suitable distances apart which when screwed up (by their pressure on any particular part of the side n" of the ink space) spring that part of it on which they act enough to cut off or prevent any portion of ink from adhering to the surface of the fountain roller as it leaves the plate h" — The edge of the plate h" is accurately ground to coincide with the edge of the fountain roller in order when necessary to shut off the ink perfectly. o" is the roller for receiving the ink from the fountain roller and imparting it to the main distributing roller p". q" is the small roller commonly denominated the "traveller" for lateral distribution. This and the before mentioned roller are constructed and act similar to others heretofore used in printing presses of this description. The main cylindrical roller p" is turned round by a belt or cord passing over a pulley r" on its axis and under the small guide pulley pulleys S."S." over the pulley t." on the axis of the driving shaft
or attached to the arms of the fly wheel. The rollers for applying
the ink to the types are u" u" and revolve in bearings attached
to the frisket carriage which when it goes out from the forme
carrying a frisket with the printed sheet applies these rollers
to the surface of the types passing over the forme twice, when
the carriage returns it deposits the rollers on the main dis-
tributing cylinder p" — All the above parts of the inking appar
atus with the exception of the fountain are constructed and act
similar to those heretofore used with only a little variation
of form and size to adapt them to the particular shape of the
frame of the press and machinery connected to it. M"M"
are rollers for supporting the platten on rails N."N." affixed
to or making a part of the frame. Two horizontal shafts O" O"
revolve in boxes connected to the platten as seen in the drawings—
On the extremities of each are cranks on which are placed
the rolls M"M" During the time the press is in action these
cranks with the rolls are turned up in the position in Fig's 1&2.
but when it becomes necessary to slide the platten away from
the forme on the bed— they may be turned downwards so that
their circumferences shall touch on the tops of the rails N."N."
A circular plate P" having two notches opposite to one
another is fixed on each shaft. When the rolls M"M" are
turned up or down a projection from a spring R" enters into
one of these notches and confines the shaft to the position in
which it may be placed. What is usually termed by print-
ers the strength of the impression is regulated by dividing the
circular parts of the nuts on the tops of the bolts o. o. into equal
distances and countersinking, or drilling, holes at each division
into which an index pointer on the end of a spring X" enters
and confines the nut to any position on the screw in which it
may be placed. Both nuts are divided alike so that by
turning round each the same number of divisional distances "
the the face of the platten will always be parallel to the forme of the
types in the bed according as they are turned at pleasure in
In most "power presses" the "tympan sheet" is moved outward
from under the platten with the printed sheet of paper but
what I consider a great advantage in my press over others consists
in making the tympan sheet stationary. It is stretched
over the blanket on the under side of the platten in any conven-
ient manner. When the impression has ceased the platten
rises a short distance before the frisket begins to ascend in
order that the tympan sheet shall effectually clear itself
from the paper. This is effected by a proper formation of the cam
W. so that while the roller is moving over a certain part of it
it shall produce no motion of the frisket. The difficulty gener-
ally experienced in other presses consists in the adhesion of the
sheet of paper to the tympan sheet so that it becomes necessa-
ry that the tympan sheet and the paper be brought out from
between the platten and forme at the same time. By thus
raising the platten before the frisket the above difficulty is suc-
cessfully obviated. I have herein above described many improve-
ments in printing press machinery which I believe to be new
and useful. but those to which I shall confine my claim
are as follows viz. First. the application of two friskets at
one end of a forme to move in grooves parallel with the face
of the types in such manner that on the arrival of either fris-
ket at the extreme ends of one sett of the grooves it shall be
received in grooves in plates of metal moving in a perpen-
dicular direction to the face of the types and lowered and raised
to another sett of grooves either below or above the first mentioned
sett of grooves and parallel with the same to be moved in an
opposite direction either in between the platten and forme or
out from the same. Second The combination of the whole
machinery herein described for producing the above motion of
two friskets applied to the same side of a forme and separate
ly by and singly. I claim as parts of this combination. The mode
of alternately changing a frisket from one sett of the grooves to
the other sett. by grooves in moveable plates z. a' Also the
construction of the plate a' with curved pieces of Metal g'g'.
and springs h' h' to press the said curved pieces outward and
further the small gravitating pieces w.w" and springs x'x'.
for the object and to act as herein above mentioned. Instead of
setts of long grooves x. y. for supporting the ears or projections of
the friskets. I substitute long ledges situated in regard to
each other as the different setts of grooves above described.
These ledges are also attached to the plates a' z, in the situation
of the grooves in each and being attached to or projecting from
the sides at the tops of the curved pieces of metal g'. g'. The ears
of the friskets are to be made of suitable thickness to have grooves
cut or formed in the ends of the same to rest and be sustained on
the projections above mentioned [illegible]. In other respects the
action and path described by the motions of the friskets are
the same as those aforementioned, but this is a vice versa
application of the parts or in other words placing the grooves
in the ends of the friskets and the projections that move in the
grooves on the inside of the frame of the press. This modification
of the machinery I claim. Third the construction of the cam
G with a roller in its end for the purpose of diminishing fric-
tion at the time of the impression and also of presenting at every
revolution of the cam a new surface for the roll in the pitman
to move over. Fourth Supporting the pitman on a vibrator K.
during its back and forth movements and the addition of a
stud "B" (either with or without a roller in its end) to the vibra-
tor to be acted on by a cam A" on the main shaft for pro-
ducing the back motions of the toggles. Fifth. The bars d.d.'
for counteracting the lateral pressure of the lower toggle on the
cross beam M. Should the platten be stationary and the [illegible]
moved upwards by the toggles these bars may be applied in a simi-
the ilar manner to the bed for the same purpose of preventing the lat-
eral pressure of the upper toggle on the bed. Sixth. the ar-
rangement of a vibrator T. connected by a joint to one end of a
bar S. which is supported at the other end on a pin in the top
of a small vibrator V. the said pin having a roller on it travel-
ling in the grooved cam R on the main shaft for producing
the motion of the frisket carriage. Seventh. I claim the pecu-
liar [illegible] arrangement of the several parts for producing the
impression as I have above described together with the dispo-
sition and adaptation of the the other parts of the machinery
to my improvements so as to constitute what is usually denom-
inated a "power press." In testimony that the above is a true
specification of my said invention and improvements I have
hereunto set my hand this sixteenth day of August in the
Year of our Lord Eighteen hundred and thirty four.

Witnesses
Robt H. Eddy
Calvin Brown

Otis Tufts ( Drawing )

Exd.
W.G.C.

[5316 words]